US008045700B2

(12) United States Patent  
Bruce et al.

(10) Patent No.: US 8,045,700 B2
(45) Date of Patent: Oct. 25, 2011

(54) SYSTEM AND METHOD OF PROVIDING VOICE COMMUNICATION

(75) Inventors: Les Bruce, Chicago, IL (US); Jeffrey L. Brandt, Cedar Park, TX (US); Marc A. Sullivan, Austin, TX (US); Mark B. Hubscher, San Antonio, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1218 days.

(21) Appl. No.: 11/586,482

(22) Filed: Oct. 25, 2006

(65) Prior Publication Data

US 2008/0104630 A1 May 1, 2008

(51) Int. Cl.
*H04M 3/00* (2006.01)
(52) U.S. Cl. .................................. 379/309; 379/265.01
(58) Field of Classification Search ............ 379/265.01–265.14, 266.01–266.1, 309
See application file for complete search history.

(56) References Cited

U.S. PATENT DOCUMENTS

| 6,882,709 | B1 * | 4/2005 | Sherlock et al. ........... 379/90.01 |
| 6,971,072 | B1 * | 11/2005 | Stein .............................. 715/866 |
| 7,277,445 | B2 * | 10/2007 | Bartfeld et al. ............... 370/401 |
| 7,466,810 | B1 * | 12/2008 | Quon et al. ............... 379/201.01 |
| 7,835,506 | B2 * | 11/2010 | Groff et al. ................. 379/90.01 |
| 2004/0260413 | A1 * | 12/2004 | Melideo .......................... 700/87 |
| 2007/0053653 | A1 * | 3/2007 | Huntington ..................... 386/46 |

* cited by examiner

*Primary Examiner* — William Deane, Jr.
(74) *Attorney, Agent, or Firm* — Toler Law Group

(57) ABSTRACT

A method is presented of providing voice communication, including receiving at a set-top box device a selection of a first contact, receiving data indicating that a first call has been placed to a phone associated with the first contact, and sending data to a display device coupled to the set-top box device indicating that the first call has been placed to the phone associated with the first contact. The method may further include sending data identifying the first contact and the user phone to a communication server of an Internet Protocol Television system, wherein the communication server places the first call to the phone associated with the first contact and routes the first call to the user phone.

20 Claims, 8 Drawing Sheets

SYSTEM AND METHOD OF PROVIDING VOICE COMMUNICATION

FIELD OF THE DISCLOSURE

The present disclosure relates generally to providing voice communication.

BACKGROUND

Television viewing is part of daily life for many people. Individuals may prefer to make phone calls while watching television. Nonetheless, a caller may have to interrupt television viewing to look up a contact's phone number, for example, in a phone directory. Hence, there is a need for an improved system and method of providing voice communication.

DETAILED DESCRIPTION OF THE DRAWINGS

In an embodiment, a system to provide voice communication is disclosed, including a set-top box device having a processor and a memory device accessible to the processor, wherein the memory device includes instructions executable by the processor to receive a selection of a contact, to determine whether a call has been placed to a phone associated with the contact, and to send data to a display device coupled to the set-top box device, the data indicating that the call has been placed to the phone associated with the contact.

In an embodiment, a method of providing voice communication is disclosed, including receiving, at a set-top box device, a selection of a first contact, receiving data at the set-top box indicating that a first call has been placed to a phone associated with the first contact, and sending data to a display device coupled to the set-top box device, the data indicating that the first call has been placed to the phone associated with the first contact.

In another embodiment, a method of providing voice communication is disclosed, including receiving contact selection data from a set-top box device at a communication server of an Internet Protocol Television (IPTV) system, the contact selection data indicating a selection of a contact, placing a call to a phone associated with the contact and routing the call to a user phone, and sending call placement data to the set-top box indicating that the call has been placed to the phone associated with the contact.

In another embodiment, a computer-readable medium is disclosed, tangibly embodying a program of instructions to manipulate a computing platform to receive, at a set-top box device, a selection of a contact, receive, at the set-top box, a selection of a user phone, determine whether a call has been placed to a phone associated with the contact, and send data to a display device coupled to the set-top box device, the data indicating that the call has been placed to the phone associated with the contact, and that the call can be joined via the user phone.

Figure 1:
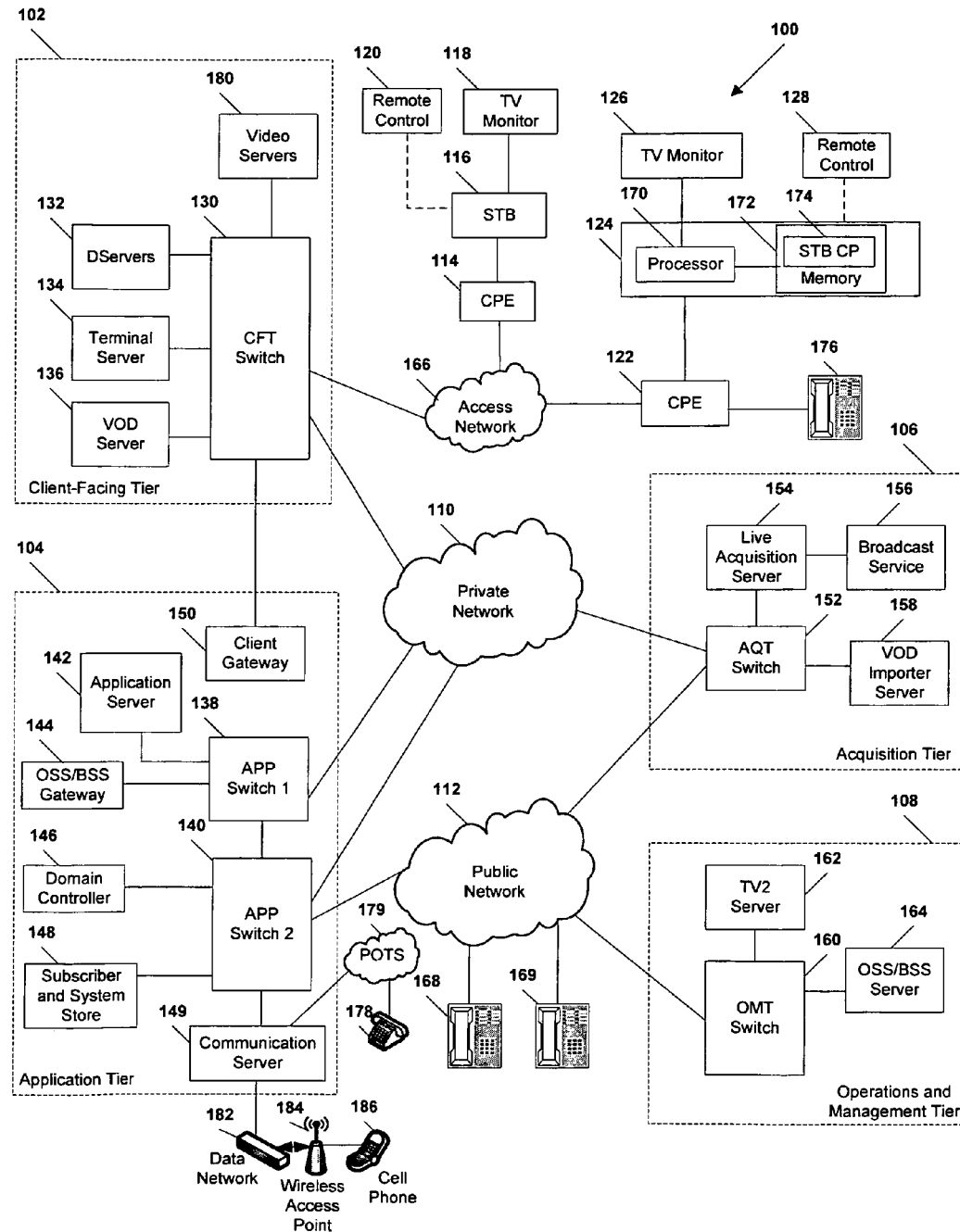
FIG. 1 is a block diagram illustrating a particular illustrative embodiment of a system to provide voice communication.

Referring to FIG. 1, an illustrative embodiment of an Internet Protocol Television (IPTV) system that may be used to provide voice communication is generally designated 100. As shown, the system 100 can include a client facing tier 102, an application tier 104, an acquisition tier 106, and an operations and management tier 108. Each tier 102, 104, 106, 108 is coupled to a private network 110; to a public network 112, such as the Internet; or to both the private network 110 and the public network 112. For example, the client-facing tier 102 can be coupled to the private network 110. Further, the application tier 104 can be coupled to the private network 110 and to the public network 112. The acquisition tier 106 can also be coupled to the private network 110 and to the public network 112. Additionally, the operations and management tier 108 can be coupled to the public network 112.

As illustrated in FIG. 1, the various tiers 102, 104, 106, 108 communicate with each other via the private network 110 and the public network 112. For instance, the client-facing tier 102 can communicate with the application tier 104 and the acquisition tier 106 via the private network 110. The application tier 104 can communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104, including, but not limited to, a client gateway 150, can communicate directly with the client-facing tier 102.

The client-facing tier 102 can communicate with user equipment via an access network 166, such as an Internet Protocol Television (IPTV) access network. In an illustrative embodiment, customer premises equipment (CPE) 114, 122 can be coupled to a local switch, router, or other device of the access network 166. The client-facing tier 102 can communicate with a first representative set-top box device 116 via the first CPE 114 and with a second representative set-top box device 124 via the second CPE 122. One or more user phones 176 may be coupled to the Customer Premises Equipment (CPE) 122. In a particular embodiment, the first representative set-top box device 116 and the first CPE 114 can be located at a first customer premise, and the second representative set-top box device 124 and the second CPE 122 can be located at a second customer premise. In another particular embodiment, the first representative set-top box device 116 and the second representative set-top box device 124 can be located at a single customer premise, both coupled to one of the CPE 114, 122.

The CPE 114, 122 can include routers, local area network devices, modems, such as digital subscriber line (DSL) modems, any other suitable devices for facilitating communication between a set-top box device, the access network 166, and the user phone(s) 176, or any combination thereof. In an exemplary embodiment, the client-facing tier 102 can be coupled to the CPE 114, 122 via fiber optic cables. In another exemplary embodiment, the CPE 114, 122 can be digital subscriber line (DSL) modems that are coupled to one or more network nodes via twisted pairs, and the client-facing tier 102 can be coupled to the network nodes via fiber-optic cables. Each set-top box device 116, 124 can process data received via the access network 166, via an IPTV software platform, such as Microsoft® TV IPTV Edition.

The first set-top box device 116 can be coupled to a first external display device, such as a first television monitor 118, and the second set-top box device 124 can be coupled to a second external display device, such as a second television monitor 126. Moreover, the first set-top box device 116 can communicate with a first remote control 120, and the second set-top box device 124 can communicate with a second remote control 128. The set-top box devices 116, 124 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 116, 124 can receive data, video, or any combination thereof, from the client-facing tier 102 via the access network 166 and render or display the data, video, or any combination thereof, at the display device 118, 126 to which it is coupled. In an illustrative embodiment, the set-top box devices 116, 124 can include tuners that receive and decode television programming signals or packet streams for transmission to the display devices 118, 126. Further, the set-top box devices 116, 124 can include a STB processor 170 and a STB memory device 172 that is accessible to the STB processor 170. In one embodiment, a computer program, such as the STB computer program 174, can be embedded within the STB memory device 172.

In an illustrative embodiment, the client-facing tier 102 can include a client-facing tier (CFT) switch 130 that manages communication between the client-facing tier 102 and the access network 166 and between the client-facing tier 102 and the private network 110. As illustrated, the CFT switch 130 is coupled to one or more data servers, such as D-servers 132, that store, format, encode, replicate, or otherwise manipulate or prepare video content for communication from the client-facing tier 102 to the set-top box devices 116, 124. The CFT switch 130 can also be coupled to a terminal server 134 that provides terminal devices with a connection point to the private network 110. In a particular embodiment, the CFT switch 130 can be coupled to a video-on-demand (VOD) server 136 that stores or provides VOD content imported by the IPTV system 100. Further, the CFT switch 130 is coupled to one or more video servers 180 that send the video content to the set-top boxes 116, 124 via the access network 166. In a particular embodiment, the CFT switch 130 can be coupled to a video-on-demand (VOD) server 136 that stores or provides VOD content imported by the IPTV system 100. Further, the CFT switch 130 is coupled to one or more multicast video servers 180 that receive video content and multicast the video content to the set-top boxes 116, 124 via the access network 166.

In an illustrative embodiment, the client-facing tier 102 can communicate with a large number of set-top boxes via the access network 166, such as the representative set-top boxes 116, 124, over a wide geographic area, such as a neighborhood area, a metropolitan area, a viewing area, a statewide area, a regional area, a nationwide area or any other suitable geographic area, market area, or subscriber or customer group that can be supported by networking the client-facing tier 102 to numerous set-top box devices. In a particular embodiment, the CFT switch 130, or any portion thereof, can include a multicast router or switch that communicates with multiple set-top box devices via a multicast-enabled network.

As illustrated in FIG. 1, the application tier 104 can communicate with both the private network 110 and the public network 112. The application tier 104 can include a first application tier (APP) switch 138 and a second APP switch 140. In a particular embodiment, the first APP switch 138 can be coupled to the second APP switch 140. The first APP switch 138 can be coupled to an application server 142 and to an operation systems and support (OSS)/billing systems and support (BSS) gateway 144. In a particular embodiment, the application server 142 can provide applications to the set-top box devices 116, 124 via the access network 166, which enable the set-top box devices 116, 124 to provide functions, such as interactive program guides, video gaming, display, messaging, processing of VOD material and other IPTV content, etc. In a particular embodiment, the OSS/BSS gateway 144 includes operation systems and support (OSS) data, as well as billing systems and support (BSS) data. In one embodiment, the OSS/BSS gateway 144 can provide or restrict access to an OSS/BSS server 164 that stores operations and billing systems data.

The second APP switch 140 can be coupled to a domain controller 146 that provides Internet access, for example, to users at their computers via the public network 112. For example, the domain controller 146 can provide remote Internet access to IPTV account information, e-mail, personalized Internet services, or other online services via the public network 112. In addition, the second APP switch 140 can be coupled to a subscriber and system store 148 that includes account information, such as account information that is associated with users who access the IPTV system 100 via the private network 110 or the public network 112. In an illustrative embodiment, the subscriber and system store 148 can store subscriber or customer data and create subscriber or customer profiles that are associated with IP addresses, stock-keeping unit (SKU) numbers, other identifiers, or any combination thereof, of corresponding set-top box devices 116, 124. Further, the second APP switch 140 can communicate with phones 168, 169, 178, 186 via the public network 112, a plain old telephone service (POTS) 179, data network 182 and wireless access point 184, or any combination thereof. Moreover, the second APP switch 140 can be coupled to a subscriber and system store 148 that includes account information, such as account information that is associated with users who access the IPTV system 100 via the private network 110 or the public network 112. The second APP switch 140 can be coupled to a communication server 149 that is adapted to establish communication between the phone 168 of a selected contact, and a user phone 176. A communication server 149 can communicate with phones 168, 169 over the public network 112 via the second APP switch 140.

In an illustrative, non-limiting embodiment, phones 168 and 169, which may be phones associated with a contact entry in a network address book or other address book, can communicate with the IPTV system 100 via the public network 112. In another illustrative, non-limiting embodiment, wireless phone 186, which may be a phone associated with a contact entry in a network address book or other address book, can communicate with the IPTV system 100 via a wireless access point 184 and data port 182 to the communication server 149. In yet another illustrative, non-limiting embodiment, phone 178, which may be a phone associated with a contact entry in a network address book or other address book, can communicate with the IPTV system 100 via a plain old telephone service (POTS) 179 to the communication server 149.

In a particular embodiment, the application tier 104 can include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto. In an illustrative embodiment, the set-top box devices 116, 124, or other devices coupled to the CPE 114, 122, can access the IPTV system 100 via the access network 166, using information received from the client gateway 150. User devices can access the client gateway 150 via the access network 166, and the client gateway 150 can allow such devices to access the private network 110 once the devices are authenticated or verified. Similarly, the client gateway 150 can prevent unauthorized devices, such as hacker computers or stolen set-top box devices from accessing the private network 110, by denying access to these devices beyond the access network 166.

For example, when the first representative set-top box device 116 accesses the client-facing tier 102 via the access network 166, the client gateway 150 can verify subscriber information by communicating with the subscriber and system store 148 via the private network 110. Further, the client gateway 150 can verify billing information and status by communicating with the OSS/BSS gateway 144 via the private network 110. In one embodiment, the OSS/BSS gateway 144 can transmit a query via the public network 112 to the OSS/BSS server 164. After the client gateway 150 confirms subscriber and/or billing information, the client gateway 150 can allow the set-top box device 116 to access IPTV content and VOD content at the client-facing tier 102. If the client gateway 150 cannot verify subscriber information for the set-top box device 116, e.g., because it is connected to an unauthorized twisted pair, the client gateway 150 can block transmissions to and from the set-top box device 116 beyond the access network 166.

As indicated in FIG. 1, the acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives or acquires television content, movie content, advertisement content, other video content, or any combination thereof, from a broadcast service 156, such as a satellite acquisition system or satellite head-end office. In a particular embodiment, the live acquisition server 154 can transmit content to the AQT switch 152, and the AQT switch 152 can transmit the content to the CFT switch 130 via the private network 110.

In an illustrative embodiment, content can be transmitted to the D-servers 132, where it can be encoded, formatted, stored, replicated, or otherwise manipulated and prepared for communication from the video server(s) 180 to the set-top box devices 116, 124. The CFT switch 130 can receive content from the video server(s) 180 and communicate the content to the CPE 114, 122 via the access network 166. The set-top box devices 116, 124 can receive the content via the CPE 114, 122, and can transmit the content to the television monitors 118, 126. In an illustrative embodiment, video or audio portions of the content can be streamed to the set-top box devices 116, 124.

Further, the AQT switch 152 can be coupled to a video-on-demand importer server 158 that receives and stores television or movie content received at the acquisition tier 106 and communicates the stored content to the VOD server 136 at the client-facing tier 102 via the private network 110. Additionally, at the acquisition tier 106, the video-on-demand (VOD) importer server 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When users issue requests for VOD content via the set-top box devices 116, 124, the requests can be transmitted over the access network 166 to the VOD server 136, via the CFT switch 130. Upon receiving such requests, the VOD server 136 can retrieve the requested VOD content and transmit the content to the set-top box devices 116, 124 across the access network 166, via the CFT switch 130. The set-top box devices 116, 124 can transmit the VOD content to the television monitors 118, 126. In an illustrative embodiment, video or audio portions of VOD content can be streamed to the set-top box devices 116, 124.

FIG. 1 further illustrates that the operations and management tier 108 can include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 can be coupled to an OSS/BSS server 164 and to a simple network management protocol (SNMP) monitor 186 that monitors network devices within or coupled to the IPTV system 100. In a-particular embodiment, the OMT switch 160 can communicate with the AQT switch 152 via the public network 112.

In an illustrative embodiment, the live acquisition server 154 can transmit content to the AQT switch 152, and the AQT switch 152, in turn, can transmit the content to the OMT switch 160 via the public network 112. In this embodiment, the OMT switch 160 can transmit the content to the TV2 server 162 for display to users accessing the user interface at the TV2 server 162.

In a particular embodiment, a set-top box 124 receives a selection of a first contact associated with the phone 168, with the phone 169, with the phone 178, or with wireless phone 186. The set-top box 124 may receive a selection of a user phone 176. The selection(s) are communicated to the communication server 149, which places a call to the phone associated with the first contact and routes the call to the user phone 176. The communication server 149 sends data to the set-top box 124 indicating that a call has been placed to the first contact. The set-top box device 124 receives the data indicating that the call has been placed, and the set-top box device 124 sends data to a display device 126 indicating that the first call has been placed to the first contact at phone 168. In an illustrative embodiment, the display device 126 can display a message indicating that the call can be joined at the user phone 176.

In another illustrative embodiment, after the call has been placed, the set-top box device 124 can receive another selection of a second contact. The other selection can be communicated to the communication server 149, which places a call to the second contact at, for example, phone 178 (via the POTS network 179), and routes the call to the user phone 176, forming a conference call with the phone 168, for example, the user phone 176, and the phone 178. The communication server 149 sends data to the set-top box device 124 indicating that a call has been placed to the second contact. The set-top box device 124 receives the data indicating that the call has been placed, and the set-top box device sends data to the display device 126 indicating that the second call has been placed to the second contact. As a result of forming the conference call, three or more parties, such as the user, the first contact, and the second contact, can communicate with each other simultaneously.

Figure 2:
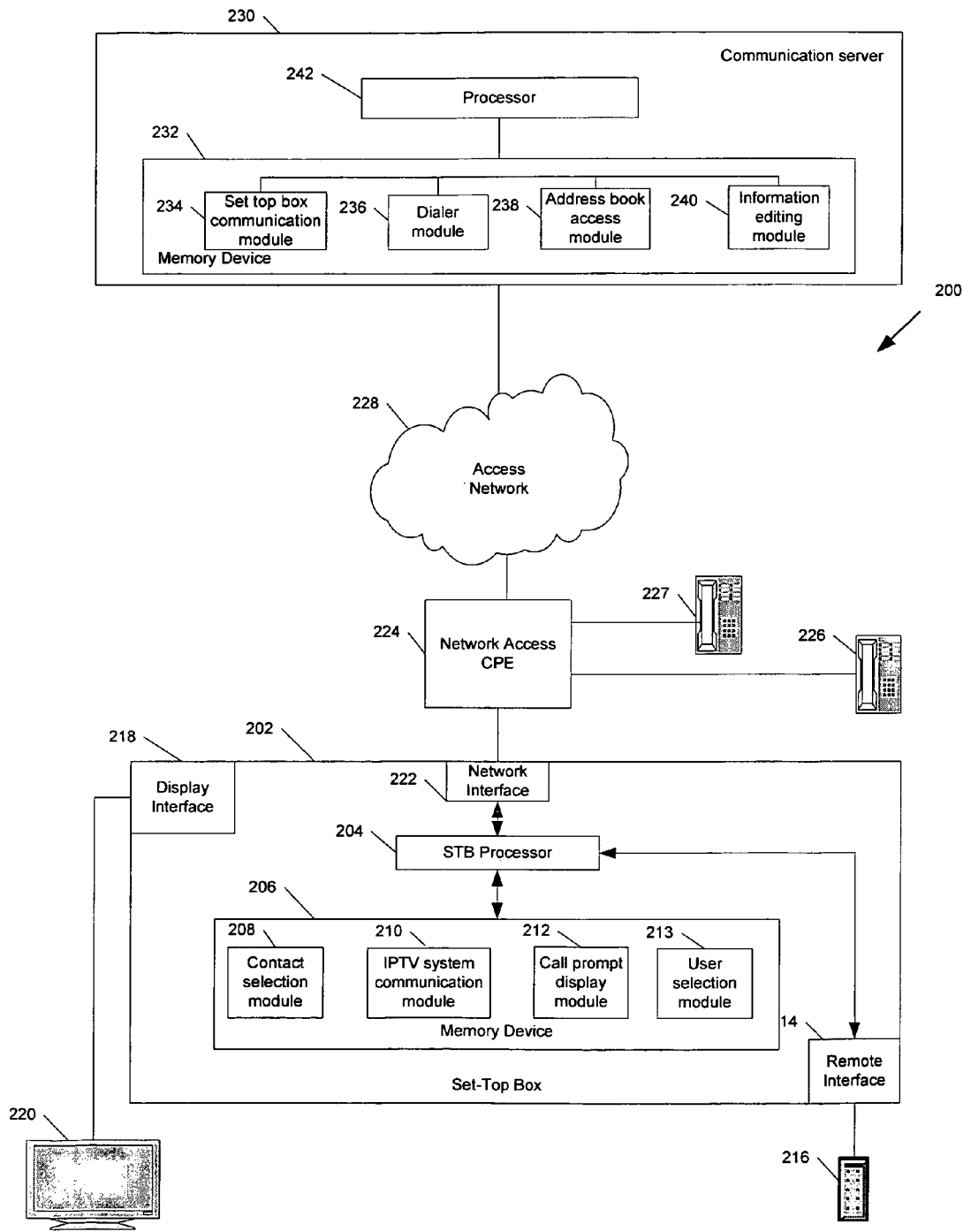
FIG. 2 is a block diagram illustrating a second particular illustrative embodiment of a system to provide voice communication.

Referring to FIG. 2, a second particular illustrative embodiment of a system to provide voice communication is illustrated and designated generally at 200. The system 200 includes a set-top box device 202 that communicates with a communication server 230 via an access network 220, such as a private access network of an Internet Protocol Television system. One or more user phones 226, 227, can also communicate with the communication server 230 via the access network 220. In an illustrative embodiment, the set-top box device 202 and the user phones 226, 227 can be coupled to network access Consumer Premises Equipment (CPE) 224.

The set-top box device 202 includes a processor 204 and a memory device 206 accessible to the processor 204. In a particular embodiment, the memory device 206 can include a contact selection module 208 executable by the processor 204 to receive a selection of a contact. In an illustrative embodiment, selection of the contact may include selection of a name, phone number, email address, street address, photograph, or any combination thereof. For example, the contact may be chosen from any of a plurality of address books such as a network address book.

In a particular embodiment, the memory device 206 can include an Internet Protocol Television (IPTV) system communication module 210 executable by the processor 204 to determine whether a call has been placed to the contact, e.g., by receiving data from the communication server 230 indicating that the contact is available to be joined to a user phone.

In a particular embodiment, the memory device 206 can include a call prompt display module 212 executable by the processor 204 to send data to a display device coupled to the set-top box device 202, the data indicating that the call has been placed to the contact. In a particular illustrative embodiment, the display device may be a television 220 coupled to the set-top box device 202 via a display interface 218.

In a particular embodiment, the memory device 206 can include a user phone selection module 213 executable by the processor 204 to receive selection of a user phone, such as the phone 226 or the phone 227.

In a particular embodiment the set-top box device 202 may also contain a remote interface 214, operative to receive commands from a remote device 216.

In an illustrative embodiment, the STB processor 204 can communicate with the communication server 230 via the network interface 222. In a particular embodiment, network access customer premises equipment (CPE) 224 can facilitate communication, via access network 228, between the network interface 222 and the communication server 230. The network access CPE 224 can include a router, a local area network device, a modem, such as a digital subscriber line (DSL) modem, and any other suitable device or any combination thereof to facilitate communication between the network interface 222 of the set-top box device 202 and the communication server 230.

The communication server 230 includes a communication server processor 242 and a memory device 232 accessible to the communication server processor 242. In a particular embodiment, the memory device 232 can include a set-top box communication module 234, executable by the communication server processor 242 to communicate with the set-top box device 202 to receive data indicating selection of a contact.

In a particular embodiment, the memory device 232 can include a dialer module 236 executable by the communication server processor 242 to place a call to a phone associated with a selected contact, and to route the call to the user phone 226, the user phone 227, or any combination thereof.

In a particular embodiment, the memory device 232 can include an address book access module 238, executable by the communication server processor 242 to access an address book. The communication server 230 can send data from the address book to the set-top box device 202 so that a user can make a selection of a contact. In an illustrative embodiment, the address book may be a network address book containing a plurality of contacts from which a contact may be chosen.

In a particular embodiment, the memory device 232 can include an information editing module 240, executable by the communication server processor 242 to receive edited information from the set-top box device 202 and to edit an entry residing in an address book. In an illustrative non-limiting embodiment, information editing module 240 can be executable by the communication server processor 242 to edit a field that is part of a contact entry within the network address book.

In an illustrative embodiment, the communication server 230 may receive data indicating selection of a contact and a selection of a user phone 226 from the set-top box device 202. The communication server 230 then accesses an address book, such as a network address book, to retrieve contact information such as a telephone number for the chosen contact. The communication server 230 places a call to a phone associated with the contact and to the user phone 226. The communication server 230 sends data to the set-top box device 202 via the access network 228 and the network access CPE 224, indicating that the call has been placed to the phone associated with the contact, and is joined to the user phone 226.

Figure 3:
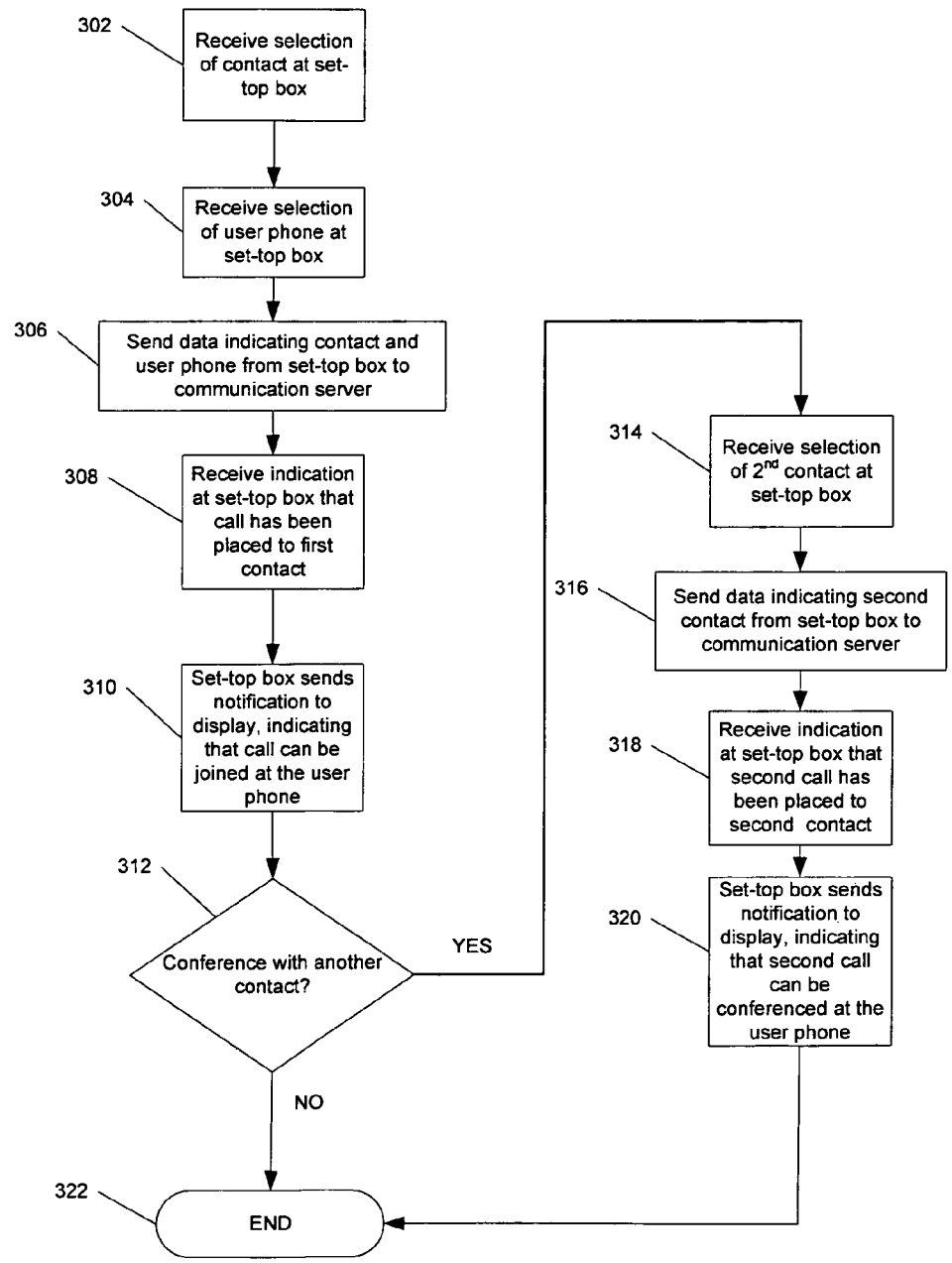
FIG. 3 is a flow diagram depicting a particular illustrative embodiment of a method of providing voice communication.

Referring to FIG. 3, a particular illustrative embodiment of a method of providing voice communication is shown. At block 302, a selection of a contact is received at a set-top box device. Moving to block 304, the set-top box device receives a selection of a user phone. In an illustrative, non-limiting embodiment, the user may choose one of a plurality of phones. Proceeding to block 306, the set-top box device sends data to a communication server, the data indicating the contact and the user phone. Advancing to block 308, the set-top box device receives data indicating that the call has been placed to the first contact.

At block 310, the set-top box device sends a notification to a display device coupled to the set-top box device, indicating that the call can be joined at the selected user phone. In an illustrative embodiment, a selection of a call placement indicator can be received at the set-top box device before sending the data indicating the contact and user phone, to the communication server. In a particular non-limiting embodiment, the call placement indicator may be a "click-to-call" or similar graphic indicator.

Continuing to decision node 312, in a particular embodiment, the set-top box device can determine whether another contact is to be conferenced with the call. If the set-top box device determines that there is not another contact to be conferenced with the call, the method terminates at 322. On the other hand, if the set-top box device determines that another contact is to be conferenced with the call, the method proceeds to block 314 and a selection of a second contact may be received at the set-top box device. Moving to block 316, the set-top box device sends data to the communication server indicating the second contact. At block 318, the set-top box device receives data indicating that a call has been placed to the second contact. At block 320, the set-top box device sends a notification to the display device indicating that the call can be conferenced at the user phone. The method terminates at 322.

Figure 4:
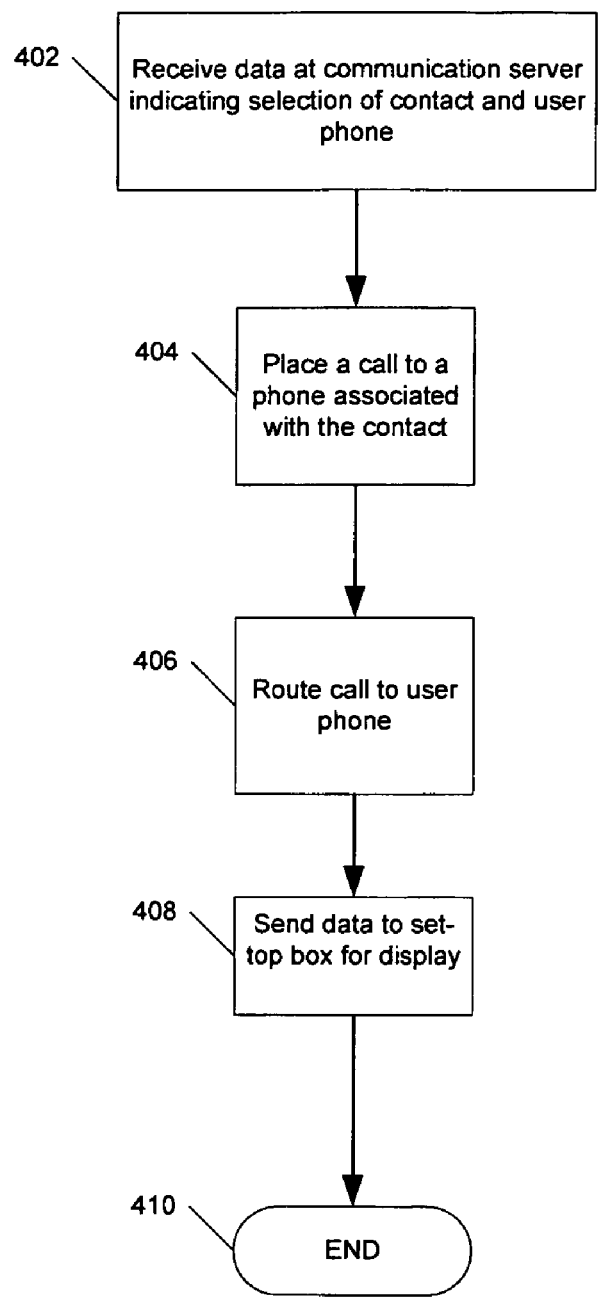
FIG. 4 is a flow diagram depicting a second particular illustrative embodiment of a method of providing voice communication.

Referring to FIG. 4, a second particular illustrative embodiment of a method of providing voice communication is illustrated. At block 402, a communication server of an Internet Protocol Television (IPTV) system receives data from a set-top box device indicating a selection of a contact. In an illustrative embodiment, the communication server may receive a contact selected from one of a plurality of sources that may include but are not limited to a network address book, a call log, or a voice mail indicator, each of which may be stored at the IPTV system and communicated to the set-top box device for display. Moving to block 404, the communication server places a call to the selected contact and routes the call to a user phone at block 406. In a particular embodiment, the communication server can receive data indicating a selection of the user phone, which may be chosen from a plurality of user phones. Proceeding to block 408, the communication server sends data to a set-top box device indicating that the call has been placed. The method terminates at 410.

Figure 5:
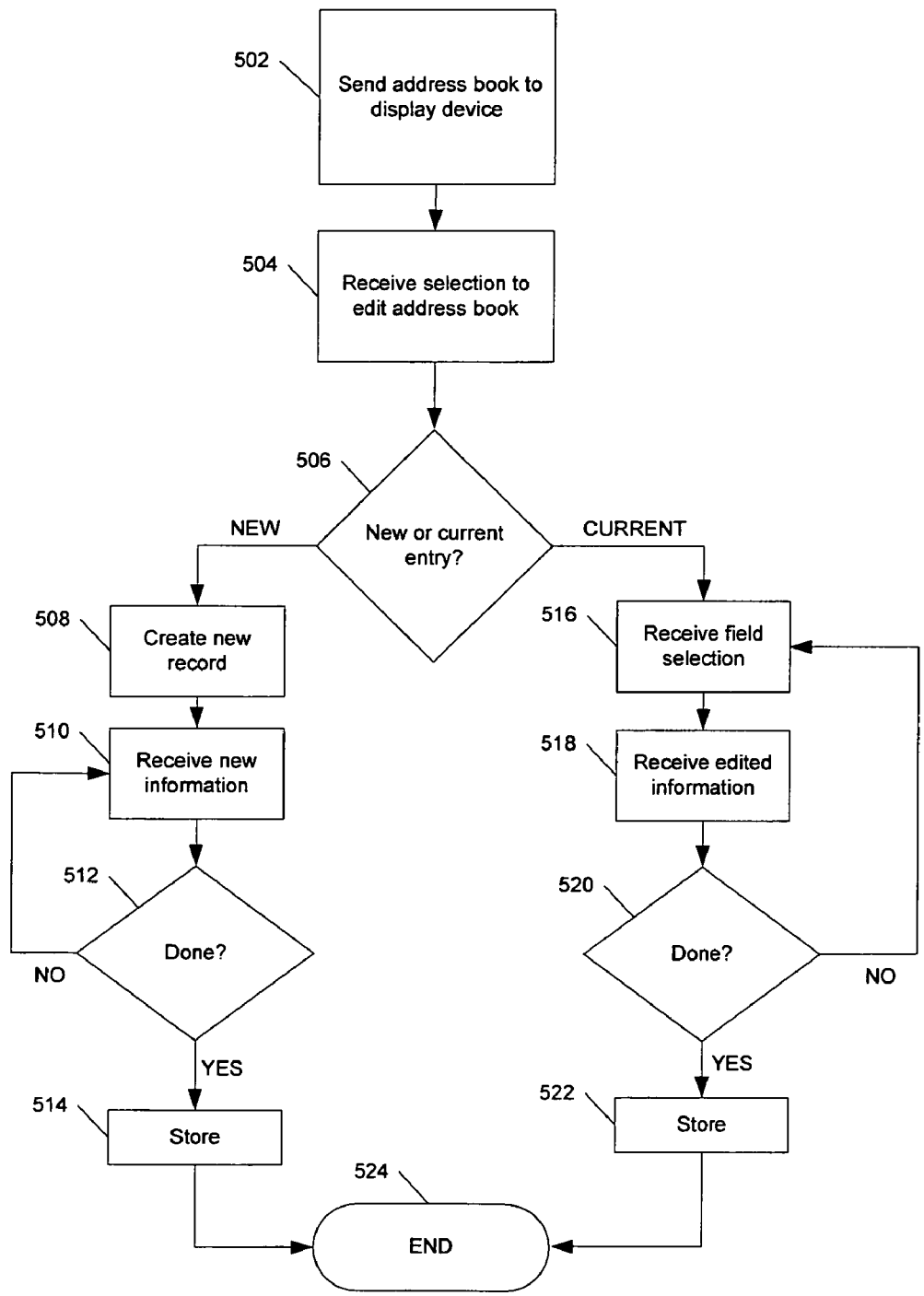
FIG. 5 is a flow diagram depicting a third particular illustrative embodiment of a method of providing voice communication.

Referring to FIG. 5, an illustrative embodiment of a method of editing contact information is illustrated. At block 502 a set-top box device sends an address book to a display device. In a non-limiting illustrative embodiment, the address book may be a network address book. Moving to block 504, the set-top box device receives a selection to edit the address book. At decision node 506, the set-top box device determines whether a new entry or an entry currently within the address book is to be edited. If a new entry is to be edited, the method proceeds to block 508, and a new record can be created. At block 510, information related to the contact is received. Moving to decision node 512, the set-top box device determines whether all new information has been received, e.g., the set-top box device can query the user to indicate whether data in all desired fields is entered. If additional data is to be entered, the method returns to block 510 and the set-top box device receives information related to the contact, until all of the data is received. At block 514, the new information is stored as a new record. The record can be stored at the set-top box, at the communication server, or at both. The method terminates at 524.

Returning to decision node 506, if a current entry is to be edited, the method proceeds to block 516, and a selection of a field to be edited can be received. At block 518, the edited information related to the field is received. At decision node 520, set-top box device determines whether all edited information has been received, e.g., the set-top box device can query the user to indicate whether data in all desired fields is entered. If additional edited information is to be received, the method returns to block 516 and proceeds to block 518, the set-top box device receiving information related to the phone contact until all of the data is received. When edits are complete, at block 522 the edited information within the fields is stored. The record can be stored at the set-top box, at the communication server, or at both. The method terminates at 524.

Figure 6A:
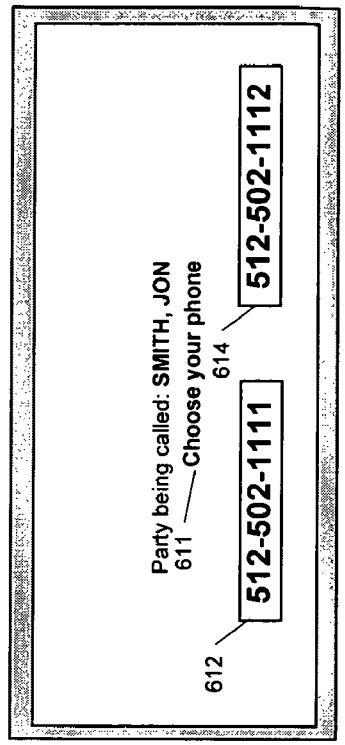
FIG. 6A is a diagram illustrating a particular illustrative embodiment of a graphical user interface to provide voice communication.

Referring to FIG. 6A, a diagram illustrating a particular illustrative embodiment of a graphical user interface to provide voice communication is illustrated. A graphical user interface (GUI) 602 includes an address book selection region 603. The address book selection region 603 can include a prompt 604 to select an address book 606 from a plurality of address books. Address book "Charles" has been highlighted by a user, and clicking on the highlighted name can select the highlighted address book.

Figure 6C:
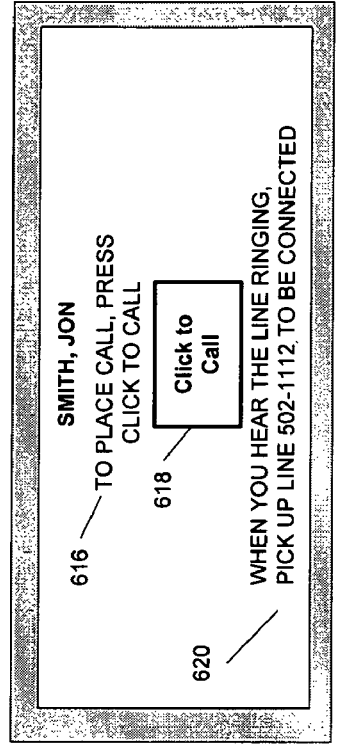
FIG. 6C is a diagram illustrating a third particular illustrative embodiment of a graphical user interface to provide voice communication.
Figure 6B:
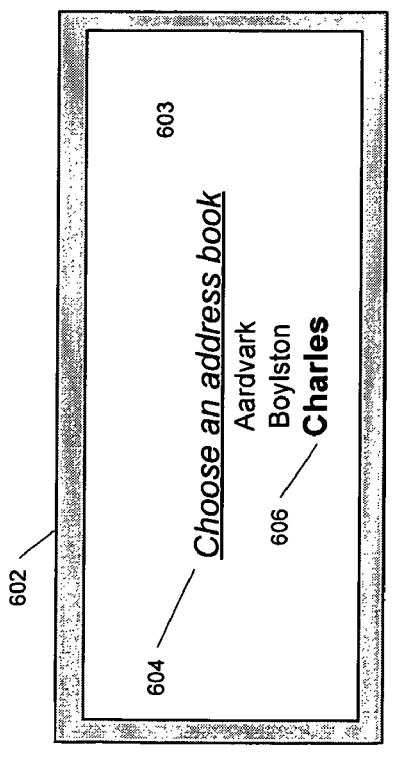
FIG. 6B is a diagram illustrating a second particular illustrative embodiment of a graphical user interface to provide voice communication.

Referring to FIG. 6B, a diagram illustrating a particular illustrative embodiment of a graphical user interface to provide voice communication is illustrated. A heading 608 indicates that address book "Charles" is being presented on the screen display. An address book entry 610 "Smith, Jon" has been highlighted by a user, and can be clicked to be selected.

Referring to FIG. 6C, a diagram illustrating a particular illustrative embodiment of a graphical user interface to provide voice communication is illustrated. A prompt 611 asks the user to choose a user phone on which to complete the call. The user phone may be selected by clicking on a soft button 612 or a soft button 614.

Figure 6D:
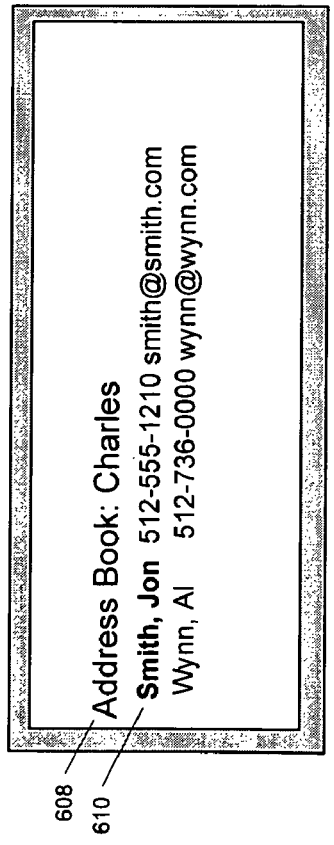
FIG. 6D is a diagram illustrating a fourth particular illustrative embodiment of a graphical user interface to provide voice communication.

Referring to FIG. 6D, a diagram illustrating a particular illustrative embodiment of a graphical user interface to provide voice communication is illustrated. A prompt 616 asks to place the call by clicking on a soft button 618 entitled "Click to Call". A prompt 620 advises the user to pick up the selected user phone when the line is ringing. In an illustrative embodiment, the ringing may be sent from a set-top box device to a display device for the user to hear.

Figure 7A:
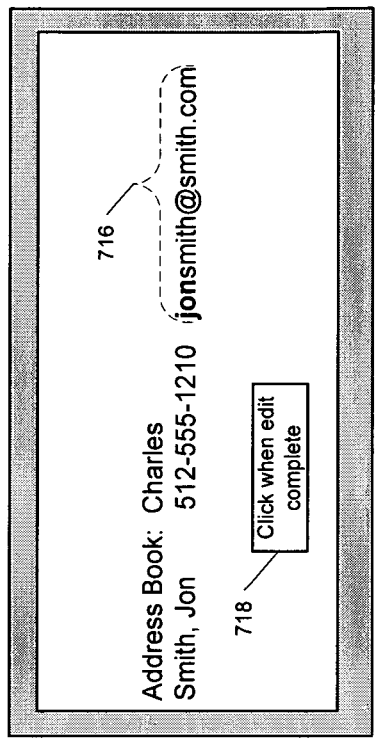
FIG. 7A is a diagram illustrating a particular illustrative embodiment of a graphical user interface to edit contact information.

Referring to FIG. 7A, a diagram illustrating a particular illustrative embodiment of a graphical user interface (GUI) to provide voice communication is illustrated. A graphical user interface (GUI) 702 includes an address book selection region 703. The address book selection region 703 can include a prompt 704 to select an address book 706 from a plurality of address books. Address book "Charles" has been highlighted by a user, and clicking on the highlighted name can select the highlighted address book.

Figure 7B:
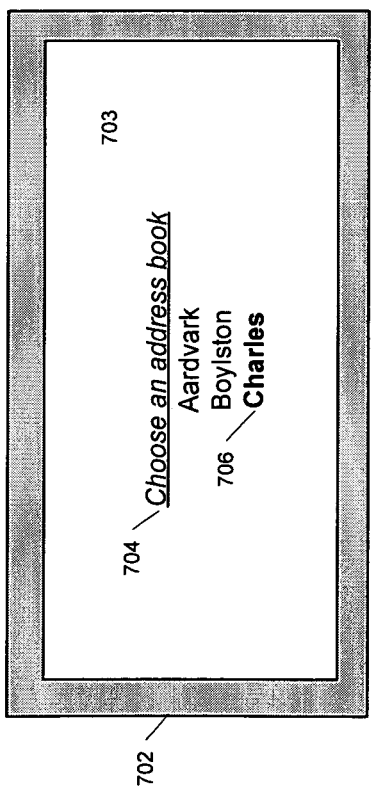
FIG. 7B is a diagram illustrating a second particular illustrative embodiment of a graphical user interface to edit contact information.

Referring to FIG. 7B, a diagram illustrating a particular illustrative embodiment of a graphical user interface (GUI) to provide voice communication an embodiment is illustrated. A heading 708 indicates that address book "Charles" is being presented on the screen display. An address book entry 710 "Smith, Jon" has been highlighted by a user. (Alternatively, a new entry line 712 may be chosen via highlighting, enabling a user to enter a new contact into the address book.) A soft button 714 can be selected by the user to initiate editing of the highlighted address book entry 710.

Figure 7C:
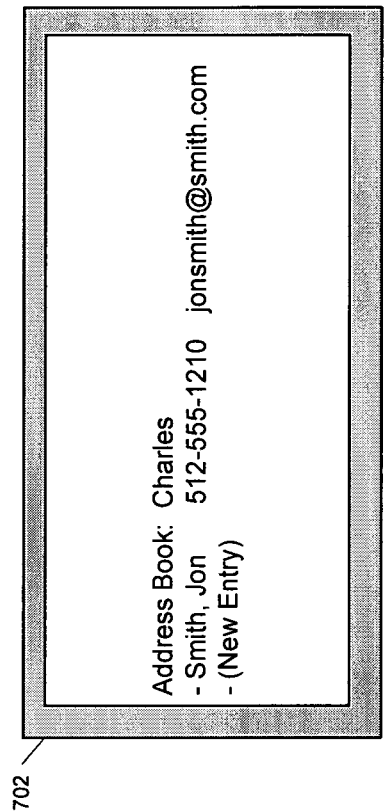
FIG. 7C is a diagram illustrating a third particular illustrative embodiment of a graphical user interface to edit contact information.

Referring to FIG. 7C, a diagram illustrating a particular illustrative embodiment of a graphical user interface (GUI) to provide voice communication an embodiment is illustrated. A region 716 displays an edited email address for Jon Smith. A soft button 718 may be selected via clicking, when editing of entry fields has been completed.

Figure 7D:
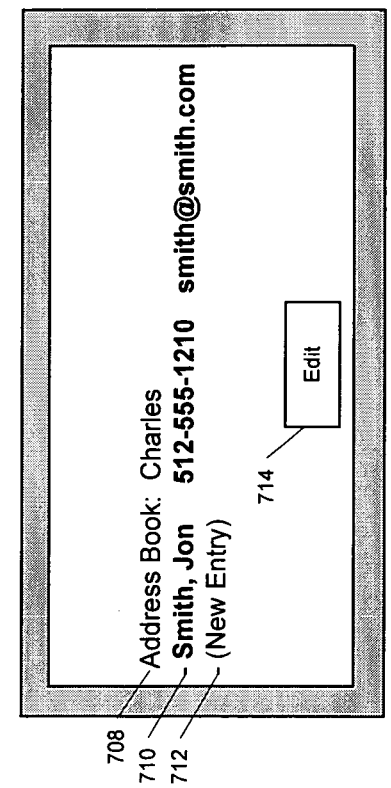
FIG. 7D is a diagram illustrating a fourth particular illustrative embodiment of a graphical user interface to edit contact information.

Referring to FIG. 7D, a diagram illustrating a particular illustrative embodiment of a graphical user interface (GUI) to provide voice communication is illustrated. The graphical user interface 702 displays the address book, wherein edits have been accepted.

In conjunction with the configuration of structure described herein, the system and method disclosed provides voice communication between two or more phones or other devices such as computers. In an illustrative embodiment, the user can select a contact by clicking on one or more soft buttons displayed via a graphical user interface. The set-top box device receives the selection data and sends the selection data to a communication server of an Internet Protocol Television (IPTV) system, which receives the data and places a call to the selected contact. The communication server sends data to the set-top box device indicating that the call has been placed. The set-top box device sends a notification that the call has been placed to the display device.

In a particular illustrative embodiment, a user phone is selected and input via the graphical user interface to the set-top box device. Data representing the user phone selected is sent to the communication server prior to dialing the phone number associated with the contact, and the communication server routes the connection between the selected contact and the selected user phone.

Figure 8:
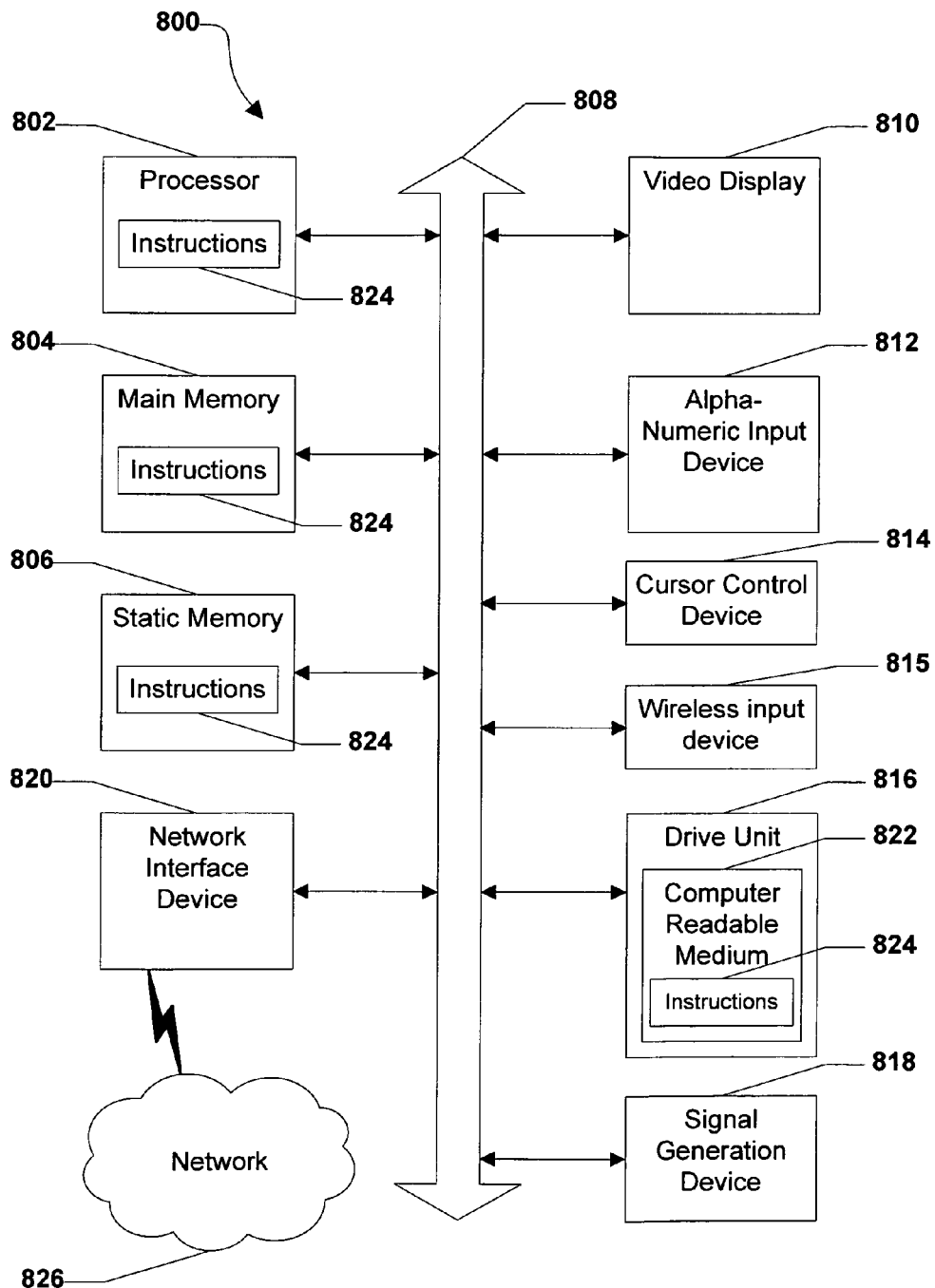
FIG. 8 is a diagram of an illustrative embodiment of a general computer system.

Referring to FIG. 8, an illustrative embodiment of a general computer system is shown and is designated 800. The computer system 800 can include a set of instructions that can be executed to cause the computer system 800 to perform any one or more of the methods or computer based functions disclosed herein. The computer system 800, or any portion thereof, may operate as a stand-alone device or may be connected, e.g., using a public network, such as the Internet, or a private network, to other computer systems or peripheral devices such as a set-top box device, communication server, or a phone, as depicted in FIGS. 1-2.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, a set-top box device (STB), a personal digital assistant (PDA), a mobile device, a palmtop computer, a laptop computer, a desktop computer, a communications device, a wireless phone, a land-line phone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

As illustrated in FIG. 8, the computer system 800 may include a processor 802, e.g., a central processing unit (CPU), a graphics processing unit (GPU), or both. Moreover, the computer system 800 can include a main memory 804 and a static memory 806 that can communicate with each other via a bus 808. As shown, the computer system 800 may further include a video display unit 810, such as a liquid crystal display (LCD), an organic light emitting diode (OLED), a flat panel display, a solid state display, or a cathode ray tube (CRT). Additionally, the computer system 800 may include an input device 812, such as a keyboard, and a cursor control device 814, such as a mouse. Further, the computer system 800 can include a wireless input device 815, e.g., a remote control device. When the computer system 800, or any portion thereof, is embodied in a set-top box device, the cursor control device 814 can be a remote control device. The computer system 800 can also include a disk drive unit 816, a signal generation device 818, such as a speaker or remote control, and a network interface device 820.

In a particular embodiment, as depicted in FIG. 8, the disk drive unit 816 may include a computer-readable medium 822 in which one or more sets of instructions 824, e.g. software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 824 or receives and executes instructions 824 responsive to a propagated signal, so that a device connected to a network 826 can communicate voice, video or data over the network 826. Further, the instructions 824 may be transmitted or received over the network 826 via the network interface device 820.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal containing computer instructions. A digital file attachment to e-mail or other self-contained information archive or set of archives is considered a distribution medium equivalent to a tangible storage medium. Accordingly, the disclosure is considered to include a tangible storage medium or distribution medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
receiving, at a set-top box device, a selection of a first contact, the first contact associated with a contact phone;
receiving, at the set-top box device, a selection of a user phone, wherein the user phone is to be used in a first call placed to the contact phone;
receiving, at the set-top box device, a selection of a call placement indicator to request initiation of the first call with resect to the contact phone and the user phone;
receiving call data at the set-top box device indicating that the first call has been placed to the contact phone; and
sending display data to a display device coupled to the set-top box device, the display data indicating that the first call has been placed to the contact phone.

2. The method of claim 1, wherein the display data sent to the display device indicates that the first call can be joined via the user phone.

3. The method of claim 2, wherein the display data sent to the display device includes an audible alert that the first call placed to the contact phone can be joined via the user phone, wherein the audible alert indicates that the contact phone is ringing.

4. The method of claim 1, further comprising sending request data identifying the first contact and the user phone to a communication server of an interne protocol television system, wherein the communication server places the first call to the first contact and routes the first call to the user phone.

5. The method of claim 4, further comprising receiving the selection of the call placement indicator before sending the request data identifying the first contact and the user phone to the communication server.

6. The method of claim 5, wherein the call placement indicator is a click-to-call graphic indicator displayed at the display device.

7. The method of claim 1, further comprising:
receiving, at the set-top box device, a second selection of a second contact;
receiving second call data, at the set-top box device, indicating that a second call has been placed to a second phone associated with the second contact; and
sending second display data to the display device, the second display data indicating that the second call has been placed to the second phone.

8. The method of claim 7, further comprising sending second request data identifying the second contact and the user phone to a communication server of an interne protocol television system, wherein the communication server places the second call to the second contact and routes the second call to the user phone to be conferenced with the first call.

9. The method of claim 1, wherein the first contact is selected at the set-top box device via at least one of a network address book, a call log, a voice mail indicator, and a manual entry.

10. The method of claim 1, further comprising prompting a user to select one of a plurality of user phones, wherein the plurality of user phones includes the user phone.

11. The method of claim 1, further comprising prompting a user to join the first call via the user phone upon reception of an audible alert, wherein the audible alert indicates that the contact phone is ringing.

12. A method comprising:
receiving contact selection data from a set-top box device at a communication server of an internet protocol television system, the contact selection data indicating a selection of a contact associated with a contact phone;
receiving user phone selection data from the set-top box device at the communication server of the internet protocol television system, the user phone selection data indicating a selection of a user phone, wherein the user phone is to be used to place a call to the contact phone;
receiving call placement indicator selection data from the set-top box device at the communication server of the internet protocol television system, the call placement indicator selection data requesting initiation of the call with respect to the contact phone and the user phone;
placing the call to the contact phone associated with the contact and routing the call to the user phone; and
sending call placement data to the set-top box device indicating that the call has been placed to the contact phone.

13. The method of claim 12, wherein the contact is selected from a contact source comprising at least one of a network address book, a call log, and a voice mail indicator, and wherein the contact source is stored at the internet protocol television system.

14. The method of claim 13, further comprising:
receiving edited information related to the contact from the set-top box device; and
storing the edited information in at least one field of the contact source.

15. A set-top box device comprising:
a processor; and
a memory accessible to the processor, wherein the memory includes instructions executable by the processor to:
receive a selection of a contact, the contact associated with a contact phone;
receive a selection of a user phone, wherein the user phone is to be used to place a call to the contact phone;
receive a selection of a call placement indicator to request initiation of the call with respect to the contact phone and the user phone;
determine whether the call has been placed to the contact phone; and
send display data to a display device coupled to the set-top box device, the display data indicating that the call has been placed to the contact phone associated with contact.

16. The set-top box device of claim 15, wherein the selection of the contact includes a selection of a field comprising at least one of a name, a phone number, an email address, a street address, and a photograph, and wherein the field is displayed at the display device coupled to the set-top box device.

17. The set-top box device of claim 16, wherein the memory includes instructions executable by the processor to receive edited information associated with the field.

18. A non-transitory computer-readable medium tangibly embodying instructions to manipulate a computing platform to:
receive, at a set-top box device, a selection of a contact, the contact associated with a contact phone;
receive, at the set-top box device, a selection of a user phone, wherein the user phone is to be used to place a call to the contact phone;
receive, at the set-top box, a selection of a call placement indicator to request initiation of the call with respect to the contact phone and the user phone;
determine whether the call has been placed to the contact phone;
send display data to a display device coupled to the set-top box device, the display data indicating that the call has been placed to the contact phone, the display data further indicating that the call can be joined via the user phone.

19. The non-transitory computer-readable medium of claim 18, wherein the contact phone associated with the contact is a plain old telephone service phone.

20. The non-transitory computer-readable medium of claim 18, wherein the contact phone associated with the contact is a wireless phone.

\* \* \* \* \*